(12) United States Patent  (10) Patent No.: US 9,324,276 B2
Baek  (45) Date of Patent: Apr. 26, 2016

(54) LIQUID CRYSTAL DISPLAY DEVICE AND METHOD FOR AUTOMATICALLY CONTROLLING BRIGHTNESS

(75) Inventor: Myoung Kee Baek, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 820 days.

(21) Appl. No.: 12/962,789

(22) Filed: Dec. 8, 2010

(65) Prior Publication Data

US 2011/0148834 A1  Jun. 23, 2011

(30) Foreign Application Priority Data

Dec. 21, 2009  (KR) .................. 10-2009-0127944

(51) Int. Cl.
*G09G 3/36* (2006.01)
*G09G 3/34* (2006.01)
*G02F 1/1333* (2006.01)

(52) U.S. Cl.
CPC .. G09G 3/3406 (2013.01); *G02F 2001/133388* (2013.01); *G02F 2201/58* (2013.01);
(Continued)

(58) Field of Classification Search
CPC .............. G09G 3/3406; G09G 2320/0646; G09G 2360/16; G09G 2360/14–2360/148; G09G 3/34; G09G 3/342; G09G 3/3426; G09G 3/3648; G09G 2300/0413; G09G 2320/041; G09G 2320/043; G09G 2320/0626; G02F 2001/13312; G02F 2001/133388; G02F 2201/58
USPC ................................................. 345/102, 207
See application file for complete search history.

(56) References Cited

U.S. PATENT DOCUMENTS

2006/0119590 A1   6/2006  Park et al.
2007/0070025 A1*  3/2007  Fujita et al. .................. 345/102
(Continued)

FOREIGN PATENT DOCUMENTS

CN       1801307 A      7/2006
CN     101180565 A      5/2008
(Continued)

OTHER PUBLICATIONS

Chinese Office Action issued in corresponding Chinese Patent Application No. 201010534207.9 dated May 3, 2012.
(Continued)

*Primary Examiner* — Amr Awad
*Assistant Examiner* — Aaron Midkiff
(74) *Attorney, Agent, or Firm* — Morgan, Lewis & Bockius LLP

(57) ABSTRACT

Disclosed herein are a liquid crystal display device including a photosensor for sensing brightness of external light such that the photosensor can stably sense the external light without influence of temperature or external noise, and a method for automatically controlling the brightness, the liquid crystal display device includes a liquid crystal panel having a display area and a non-display area defined therein and including first and second substrates facing each other and a liquid crystal layer filled between the first and second substrates, the first substrate having an outer portion protruding from the second substrate, a gate driver and a data driver formed in the non-display area of the first substrate, a photosensor formed in the outer portion of the first substrate, a dummy sensor formed in the non-display area of the first substrate covered by the second substrate, a backlight unit formed below the liquid crystal panel, and a control unit including a timing controller for controlling the gate driver, the data driver and the backlight unit, and a power supply unit for supplying a power voltage.

13 Claims, 11 Drawing Sheets

(52) U.S. Cl.
CPC ...... *G09G3/3648* (2013.01); *G09G 2300/0413* (2013.01); *G09G 2320/041* (2013.01); *G09G 2320/043* (2013.01); *G09G 2320/0626* (2013.01); *G09G 2360/144* (2013.01)

(56) References Cited

U.S. PATENT DOCUMENTS

| | | | |
|---|---|---|---|
| 2007/0268241 A1* | 11/2007 | Nitta et al. | 345/102 |
| 2008/0245948 A1 | 10/2008 | Tsai | |
| 2009/0066897 A1 | 3/2009 | Katoh et al. | |
| 2010/0045908 A1* | 2/2010 | Woo | 349/116 |

FOREIGN PATENT DOCUMENTS

| | | |
|---|---|---|
| CN | 101281916 A | 10/2008 |
| JP | 2000-122574 A | 4/2000 |
| KR | 10-2006-0056634 A | 5/2006 |

OTHER PUBLICATIONS

Office Action issued in counterpart Chinese Patent Application No. 201010534207.9 dated Apr. 27, 2013.

Office Action issued in counterpart Korean Patent Application No. 10-2009-0127944 dated Mar. 20, 2013.

* cited by examiner

LIQUID CRYSTAL DISPLAY DEVICE AND METHOD FOR AUTOMATICALLY CONTROLLING BRIGHTNESS

This application claims the benefit of Korean Patent Application No. 10-2009-0127944, filed on Dec. 21, 2009, which is hereby incorporated by reference as if fully set forth herein.

BACKGROUND OF THE INVENTION

1. Field of the Invention

The present invention relates to a liquid crystal display device, and more particularly, to a liquid crystal display device including a photosensor for sensing brightness of external light such that the photosensor can stably sense the external light without influence of a temperature or external noise, and a method for automatically controlling brightness.

2. Discussion of the Related Art

As the information age has arrived, a display field for visually displaying an electrical information signal has been rapidly developed. Accordingly, various flat display devices with excellent performance such as slimness, light weight and low power consumption have been rapidly developed and used as a replacement for Cathode Ray Tubes (CRTs).

Examples of such flat display devices include a Liquid Crystal Display (LCD) device, a Plasma Display Panel (PDP) device, a Field Emission Display (FED) device, an Electroluminescent Display (ELD) device, and the like, each of which includes a flat display panel for displaying an image as an essential component. The flat display panel includes a pair of transparent insulating substrates which are adhered to each other with a light emitting layer or a polarized material layer interposed therebetween.

Among such devices, the LCD device controls light transmission of liquid crystal using an electric field so as to display an image. An image display device includes a display panel having liquid crystal cells, a backlight unit for irradiating light to the display panel, and a driving circuit for driving the liquid crystal cells.

In the field of the LCD device, an Active Matrix LCD (AMLCD) is mainly used. In the AMLCD, one Thin Film Transistor (TFT) defines one pixel, and one TFT controls the voltage level of the pixel as a switching element so as to change the light transmission of the pixel, thereby displaying an image.

A general LCD device includes a liquid crystal panel including a plurality of TFTs arranged in a matrix to display an image, a gate driver for controlling the input of a data signal to the liquid crystal panel, a data driver for outputting a data signal to the liquid crystal panel, a timing controller for controlling the timing of each of the drivers, and a backlight unit for irradiating light to the liquid crystal panel. The backlight unit includes a backlight element located on a rear surface of the liquid crystal panel to visually display the data signal and a control unit for controlling the backlight element. Each of such components receives driving power from a power supply unit supplying power suitable for driving each of the components, and the control unit is integrated on a Printed Circuit Board (PCB).

Although not shown, the backlight element may be one or more fluorescent lamps or a plurality of Light Emitting Diodes (LEDs).

In the LCD device having such a configuration, hydrogenated amorphous silicon (a-Si:H; hereinafter, referred to as amorphous silicon) is mainly used as a semiconductor layer of a TFT. This is because a semiconductor layer can be manufactured with a large area and high productivity and can be deposited at a low substrate temperature of 350° C. or less and a cheap insulating substrate can be used.

However, the characteristics of amorphous silicon may deteriorate by the irradiation of light. In addition, it is difficult to use amorphous silicon in a driving circuit due to the electrical characteristics of the TFT (low field effect mobility: 0.1 to 1.0 cm/V·s) and deterioration in reliability.

Therefore, in an amorphous silicon TFT substrate, an insulating substrate and a PCB are connected using a Tape Carrier Package (TCP) driving Integrated Circuit (IC). Thus, cost required for the driving IC occupies a large part of production cost.

Meanwhile, the liquid crystal panel is formed by adhering two substrates to each other and is divided into a display area in which TFTs are formed so as to display an image and a non-display area in which drivers and signal wires are formed.

In more detail, in the display area, a plurality of gate lines and data lines are arranged in a matrix so as to cross each other, and the TFTs are formed at intersections where the gate lines and the data lines cross each other.

The gate driver and the data driver receive a scanning signal and a data signal from an external device and control the TFTs of the display area through the gate lines and the data lines, thereby changing the light transmission of the liquid crystal.

Although not shown, a timing controller and a power supply unit are mounted on an independently mounted PCB so as to be connected to the gate driver and the data driver. The backlight unit is mounted on the rear surface of the liquid crystal panel.

In the LCD device using amorphous silicon or polysilicon, since light generated by the backlight unit is constant, there is a limitation to control the brightness of the LCD device according to the brightness of external light. Accordingly, in order to control the brightness of the liquid crystal display device, an input voltage of the backlight unit attempts to be controlled or brightness of external light attempts to be measured using a photosensor or the like and be fed back so as to control the brightness of the backlight lamp of the LCD device.

Hereinafter, a conventional LCD device will be described with reference to the accompanying drawings.

FIG. 1 is a diagram showing a conventional mobile phone including an external photosensor.

FIG. 1 shows an application of the conventional LCD device, that is, a mobile phone 1. The mobile phone includes a screen 5 corresponding to the liquid crystal panel and an external unit having a keypad 20 for enabling a user to control an image displayed on the screen 5.

An external light sensor 10 for receiving and sensing external light is further included in the keypad 20.

That is, recently, in a mobile or small and medium-sized model, a sensor for sensing external light is mounted in an external unit, independent of a liquid crystal panel. Alternatively, in a mobile phone, an external light sensor may be further included in a camera unit.

In this case, the external light sensor 10 is formed on a semiconductor wafer as an independent sensor and is included in an independent module, independent of the liquid crystal panel.

The conventional LCD device has the following problems.

In order to control the brightness of the backlight unit, the external light sensor for sensing the external light is included in the external unit of the LCD device as the independent module, independent of the liquid crystal panel. In this case, the independent module is necessary for operating the external light sensor, thereby increasing the price of the device. In addition, a process of mounting the independent module is required and thus assembling the independent module in the LCD device becomes complicated.

SUMMARY OF THE INVENTION

Accordingly, the present invention is directed to a liquid crystal display device and a method for automatically controlling brightness that substantially obviate one or more problems due to limitations and disadvantages of the related art.

An object of the present invention is to provide a liquid crystal display device including a photosensor for sensing brightness of external light such that the photosensor can stably sense the external light without influence of temperature or external noise, and a method for automatically controlling the brightness.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a liquid crystal panel having a display area and a non-display area defined therein and including first and second substrates facing each other and a liquid crystal layer filled between the first and second substrates, the first substrate having an outer portion protruding from the second substrate, a gate driver and a data driver formed in the non-display area of the first substrate, a photosensor formed in the outer portion of the first substrate, a dummy sensor formed in the non-display area of the first substrate covered by the second substrate, a backlight unit formed below the liquid crystal panel, and a control unit including a timing controller for controlling the gate driver, the data driver and the backlight unit, and a power supply unit for supplying a power voltage.

The control unit may include a comparator configured to compare intensity of light output from the photosensor with intensity of light output from the dummy sensor, a calculator configured to calculate brightness of external light by a difference in intensity of light detected by the comparator, and a brightness controller configured to control brightness of a backlight according to the brightness of the external light.

The liquid crystal display device may further include a light shielding layer formed on each of the first substrate and the second substrate below and above the dummy sensor.

The first substrate may include a plurality of gate lines and data lines which cross each other in the display area to define pixel areas, Thin Film Transistors (TFTs) formed at intersections of the gate lines and the data lines and including a semiconductor layer formed of a polysilicon layer obtained by low-temperature crystallizing an amorphous silicon layer, and pixel electrodes respectively formed in the pixel areas.

Each of the photosensor and the dummy sensor may be formed of a Thin Film Transistor (TFT) including a polysilicon layer. At this time, the photosensor and the dummy sensor may be simultaneously formed in a process of forming the TFT.

The gate driver and the data driver may be simultaneously formed in a process of forming the gate lines, the data lines, the TFTs and the pixel electrodes.

The second substrate may further include a black matrix layer corresponding to the plurality of gate lines and data lines, and a color filter layer corresponding to the pixel areas.

A light shielding layer may be further formed on the first substrate below the photosensor.

A plurality of photosensors and dummy sensors may be included.

In another aspect of the present invention, a method for automatically controlling brightness in a liquid crystal display device includes comparing intensity of light output from the photosensor with intensity of light output from the dummy sensor, calculating brightness of external light by a difference between the intensity of light output from the photosensor and the intensity of light output from the dummy sensor, and controlling brightness of the backlight according to the calculated brightness of external light.

The calculating of the brightness of external light by the difference between the intensity of light output from the photosensor and the intensity of light output from the dummy sensor may be performed when the difference between the intensity of light output from the photosensor and the intensity of light output from the dummy sensor is greater than a threshold.

The photosensor may be formed of a thin film transistor in which photocurrent is changed according to external light. In this case, the comparing of the intensity of light output from the photosensor with the intensity of light output from the dummy sensor may be performed by detecting a difference between voltages output from the photosensor and the dummy sensor or a difference between currents output from the photosensor and the dummy sensor.

It is to be understood that both the foregoing general description and the following detailed description of the present invention are exemplary and explanatory and are intended to provide further explanation of the invention as claimed.

The liquid crystal display device and the method for automatically controlling the brightness of the present invention have the following effects.

Since the photosensor and the dummy sensor capable of detecting the difference in the intensity of light are simultaneously formed in the process of forming the TFT on the substrate including a polysilicon layer formed by a low-temperature process, influence caused from external light is excluded by calculating the output value of the dummy sensor and thus the brightness of the backlight can be automatically controlled by external light.

That is, if an environment in which the photosensor should be actually operated is abnormal, for example, if an ambient temperature is increased or noise occurs due to the presence of another light source, influence of the temperature or the noise is eliminated by the output from the dummy sensor and thus malfunction can be prevented by automatic brightness control.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, a Liquid Crystal Display (LCD) device and a method for automatically controlling brightness according to the present invention will be described in detail with reference to the accompanying drawings.

Figure 1:
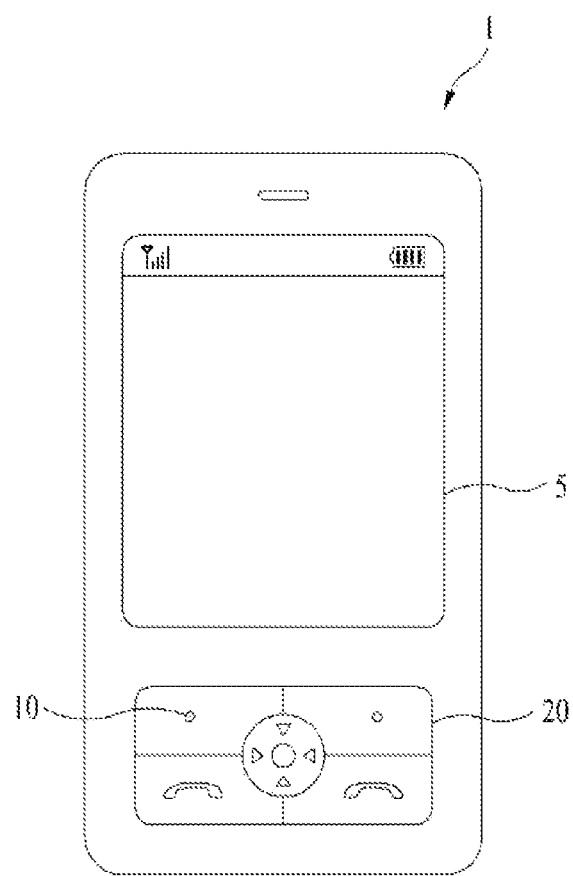
FIG. 1 is a diagram showing a conventional mobile phone including an external photosensor.
Figure 2:
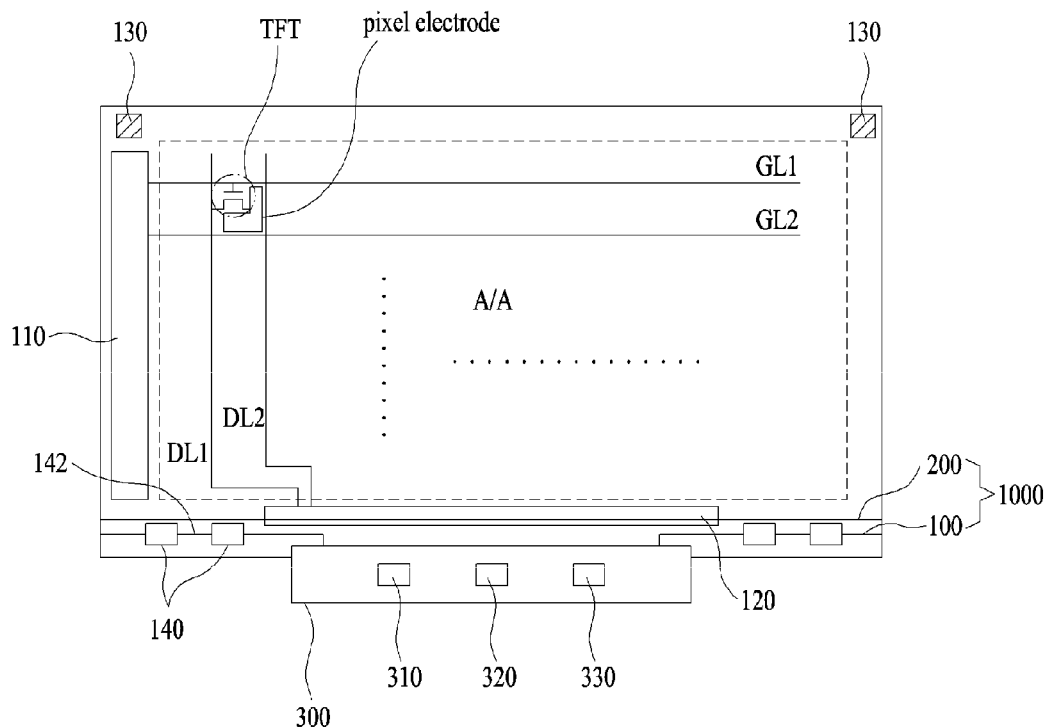
FIG. 2 is a plan view showing a Liquid Crystal Display (LCD) device according to the present invention.
Figure 3:
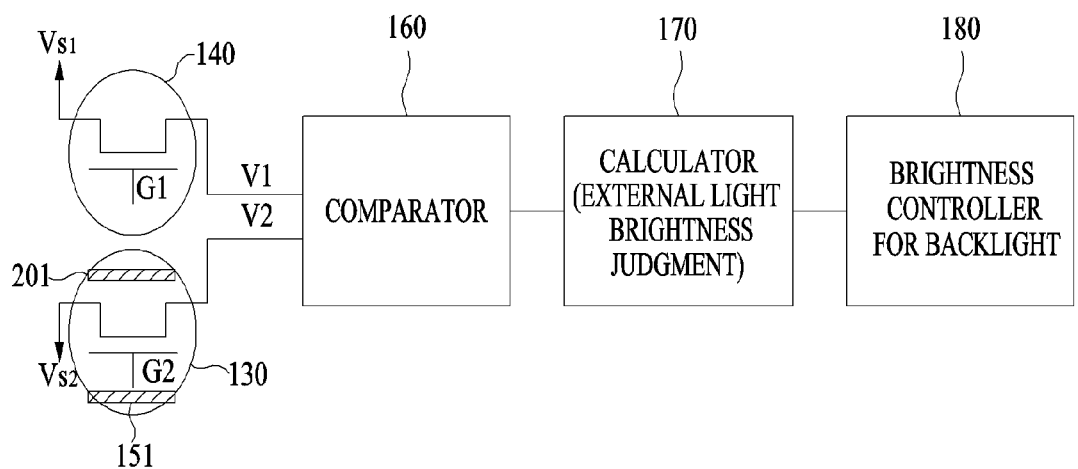
FIG. 3 is a schematic block diagram showing an automatic brightness control device of FIG. 2.

FIG. 2 is a plan view showing the LCD device according to the present invention, and FIG. 3 is a schematic block diagram showing an automatic brightness control device of FIG. 2.

As shown in FIGS. 2 and 3, in the LCD device of the present invention, a display area (A/A) and a non-display area are defined. The LCD device includes a first substrate 100, a second substrate 200, and a liquid crystal layer (not shown) filled between the first and second substrates 100 and 200. The first substrate 100 includes a liquid crystal panel 1000 having an outer portion protruding from the second substrate 200, a gate driver 110 and a data driver 120 formed in the non-display area of the first substrate 100, a photosensor 140 formed on the outer portion of the first substrate 100, a dummy sensor 130 formed in the non-display area of the first substrate 100 covered by the second substrate 200, a backlight unit (please refer to FIG. 4) formed below the liquid crystal panel, and a control unit 300 for controlling the gate driver 110, the data driver 120 and the backlight unit.

A Thin Film Transistor (TFT) array is formed in the display area of the first substrate 100, and a wiring pad for applying a signal to the TFT array and the gate driver 110 and the data driver 120 connected thereto are formed in the non-display area.

At this time, both the gate driver 110 and the data driver 120 are included in the first substrate 100 and are simultaneously formed in a process of forming the TFT array formed on the first substrate 100.

Both the photosensor 140 and the dummy sensor 130 are formed in the non-display area (outside the display area A/A) of the liquid crystal panel 1000. The dummy sensor 130 is included in an area which is not influenced by external light and the photosensor 140 is included in an area which is influenced by external light. The photosensor 140 and the dummy sensor 130 are simultaneously formed in the process of forming the TFT array. The photosensor 140 is formed in an area exposed from the second substrate 200 in order to receive external light and the dummy sensor 130 is formed in an area covered by the second substrate 200. In this case, a black matrix 201 is further formed on the second substrate 200 covered by the dummy sensor 130. FIG. 3 shows an example where a voltage source $V_{s1}$ is supplied to one of the source and drain of photosensor 140 and where the other of the source and drain supplies signal V1 to comparator 160, and where a voltage source $V_{s2}$ is supplied to one of the source and drain of photosensor 130 and where the other of the source and drain supplies signal V2 to comparator 160.

The photosensor 140 includes a connection wire 142 directly connected to the control unit 300 and, more particularly, a processor 330. As shown, in consideration of a deviation in intensity of light between areas, a plurality of photosensors is included.

Although not shown, the dummy sensor 130 is also connected to the processor 330 of the control unit 300.

In addition, a light shielding layer 151 may be further formed on a portion of the first substrate 100 below the dummy sensor 130 and the photosensor 140. In this case, the light shielding layer 151 formed on the first substrate 100 prevents influence of the backlight unit. If the backlight unit does not correspond to the non-display area in which the dummy sensor 130 or the photosensor 140 is located, the light shielding layer 151 may be omitted. However, the dummy sensor 130 is included in order to eliminate noise due to influence of factors other than external light. Accordingly, although the backlight unit does not correspond to the non-display area, the light shielding layer 151 is preferably included in order to prevent influence of interference light or the like.

The control unit 300 is a Printed Circuit Board (PCB) including a timing controller 310 and a power supply unit 320 for supplying a power voltage. The control unit 300 includes the processor 330 for comparing the sensed values output from the photosensor 140 and the dummy sensor 130.

The processor 330 includes a comparator 160 for comparing the intensity of light output from the photosensor with the intensity of light output from the dummy sensor, a calculator 170 for calculating the brightness of external light by a difference in intensity of light, which is detected by the comparator 160, and a brightness controller 180 for controlling the brightness of the backlight according to the brightness of the external light.

The reason why the dummy sensor 130 is included in addition to the photosensor 140 and the processor includes the comparator 160 is because the photosensor 140 for sensing actual external light may not accurately detect external light due to interference with light laterally incident by another light source or increase in an ambient temperature and may sense an erroneous value.

That is, the output of the dummy sensor 130 located in the area which is not influenced by external light and the output of the photosensor 140 for receiving external light are different from each other due to the difference in intensity of light. Therefore, the calculator 170 judges the brightness of external light by the difference in intensity of light.

At this time, the calculator 170 controls the brightness of the backlight according to the brightness of external light only when the difference between the intensity of light output from the photosensor and the intensity of light output the dummy sensor is greater than a predetermined threshold, and determines that the difference is generated by interference with light incident from another light source or the ambient temperature so as not to perform an automatic brightness control operation when the difference is less than the predetermined threshold.

The light shielding material of the light shielding layer 151 and the black matrix layer 201 is formed on the first and second substrates 100 and 200 so as to correspond to the dummy sensor 130. If external light is input, the external light passes through the second substrate 200 and the black matrix 201 and is input to the dummy sensor 130 through the liquid crystal layer. Then, most of the external light is shielded such that the intensity of light incident to the dummy sensor 130 is significantly reduced or is substantially close to 0. Since the dummy sensor 130 does not substantially absorb external light when being formed of a TFT, measured photocurrent is also close to 0.

In contrast, the photosensor 140 is located such that external light is input to the photosensor without passing through the second substrate 200 or the light shielding layer 201 and the liquid crystal layer, in order to absorb external light unlike the dummy sensor 130. Thus, the photosensor is formed of a TFT, photocurrent is increased as the intensity of external light is increased and thus a voltage value Vds is increased in proportion to the intensity of external light.

The first substrate 100 includes a plurality of gate lines and data lines which cross each other so as to define pixel areas, TFTs (not shown) formed at intersections of the gate lines and the data lines and including a semiconductor layer made of a polysilicon layer, and pixel electrodes respectively formed in the pixel areas, in the display area A/A.

In the process of forming the TFTs, the dummy sensor 130 and the photosensor 140 are formed of TFTs including a polysilicon layer. Alternatively, the photosensor and the dummy sensor are simultaneously formed in the process of forming the TFTs.

It is preferable that the gate driver 110 and the data driver 120 are simultaneously formed in the process of forming the gate lines, the data lines, the TFTs and the pixel electrodes.

The second substrate 200 includes a color filter array in correspondence with the display area in which the TFT array is formed. That is, the color filter array may further include the black matrix layer 201 corresponding to the plurality of gate lines and data lines, and a color filter layer 202 corresponding to the pixel areas.

It is preferable that a light shielding layer is further formed on the first substrate below the photosensor 130.

A plurality of photosensors and dummy sensors may be included.

The polysilicon layer configuring the semiconductor layer of the TFT is formed by a relatively low-temperature process due to laser crystallization or metal induced crystallization in a low-temperature polysilicon (LTPS) forming process. In a high-temperature process, processing temperature is close to 1000° C., which is greater than a temperature sufficient to modify an insulating substrate. In addition, a glass substrate exhibits poor heat-resistance. Therefore, an expensive quartz substrate with good heat-resistance should be used. In addition, when a polysilicon thin film is formed by the high-temperature process, due to low crystallinity such as fine crystal particle or high surface roughness, a device application property deteriorates, compared with a polysilicon layer formed by a low-temperature process. Therefore, a technique of forming a polysilicon layer by crystallizing amorphous silicon capable of being subjected to low-temperature deposition is proposed.

Since the semiconductor layer made of polysilicon is included, a transistor with a predetermined rate can be implemented. Accordingly, using the transistor, circuits of the gate driver 110 and the data driver 120 may be directly mounted on the first substrate 100. That is, each of the circuits of the gate driver 110 and the data driver 120 is formed of a TFT including a polysilicon layer formed by low-temperature crystallization, thereby obtaining a high rate.

In this case, the generation of control signals of the gate driver 110 and the data driver 120 and the supply of an image signal are performed by the timing controller 310 of the control unit 300.

Figure 4:
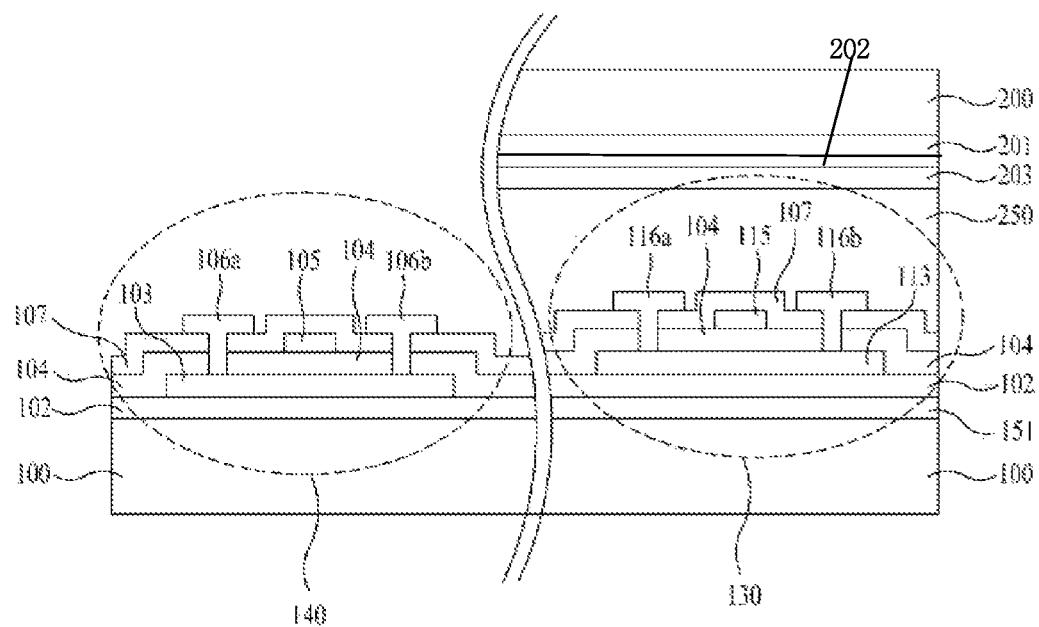
FIG. 4 is a cross-sectional view showing the configuration of a sensor unit of the automatic brightness control device of FIG. 3.

FIG. 4 is a cross-sectional view showing the configuration of a sensor unit of the automatic brightness control device of FIG. 3.

As shown in FIG. 4, the sensor unit of the automatic brightness control device includes the dummy sensor 130 and the photosensor 140, which are respectively formed on the first substrate 100 in the area which does not receive external light and the area which receives external light, as shown in FIG. 2 and are equal to the TFT in configuration.

That is, the dummy sensor 130 includes, on the first substrate 100, the light shielding layer 151, a buffer layer 102, a semiconductor layer 113 formed of low-temperature crystallized polysilicon in a predetermined area of the buffer layer 102, a gate electrode 115 formed on a central portion of the semiconductor layer 113 with a gate insulating film 104 interposed therebetween, and source and drain electrodes 116a and 116b electrically connected to both sides of the semiconductor layer 113 and formed on the gate electrode 115 with a protective film 107 interposed therebetween.

Each of the protective film 107 and the gate insulating film 104 further includes contact holes for exposing both sides of the semiconductor layer 113.

The black matrix layer 201 and a common electrode 203 are further formed on the second substrate 200 so as to face the first substrate 100 on which the dummy sensor 130 is formed.

The common electrode 203 is included in the case where an LCD device to be formed uses a vertical electric field. If a horizontal electric field is used by the pixel electrodes and a common electrode formed on the first substrate 100, the common electrode may be omitted.

The liquid crystal layer 250 is filled between the first substrate 100 having the dummy sensor 130 formed thereon and the second substrate 200. In this case, the liquid crystal layer 250 is included if the dummy sensor 130 is formed in a seal pattern (not shown) formed on an edge of the first substrate 100 and the second substrate 200, and, otherwise, is omitted.

The photosensor 140 does not correspond to the second substrate 200 and the black matrix layer 201 formed on the surface of the second substrate and does not correspond to the liquid crystal layer 250 and the light shielding layer 151, unlike the dummy sensor 130. That is, the photosensor 140 includes, on the first substrate 100, the buffer layer 102, the semiconductor layer 103 made of low-temperature crystallized polysilicon in a predetermined area of the buffer layer 102, the gate electrode 105 formed on a central portion of the semiconductor layer 103 with a gate insulating film 104 interposed therebetween, and the source and drain electrodes 106a and 106b electrically connected to both sides of the semiconductor layer 103 and formed on the gate electrode 105 with the protective layer 107 interposed therebetween.

In this case, as described above, the step of comparing the intensity of light output from the photosensor having the shape of the TFT with the intensity of light output from the dummy sensor may be performed by detecting a difference between voltages output from the photosensor and the dummy sensor or detecting a difference between currents output from the photosensor and the dummy sensor.

In a TFT configuring the photosensor or the dummy sensor, a source region (source electrode contact portion) of the semiconductor layer is formed by doping p+-type impurities and a drain region (drain electrode contact portion) is defined by doping n+-type impurities.

When 0 V is applied to the gate electrode and the source electrode of the transistor configuring the photosensor or the dummy sensor for performing the sensing function and a voltage of −5V to 15V is applied to the drain electrode, a variation in photocurrent is measured as follows.

Figure 5A:
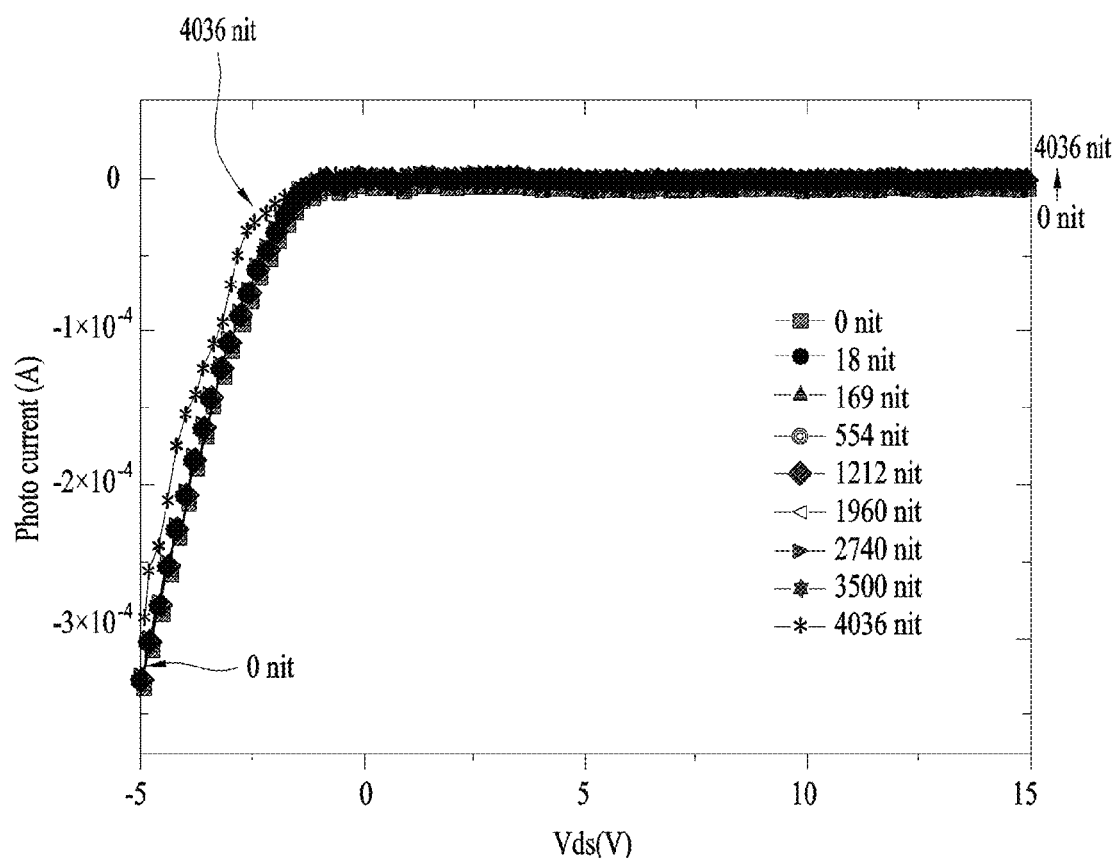
FIGS. 5A and 5B are graphs showing a variation in photocurrent according to a variation in Vds of a transistor of the sensor unit of FIG. 4.
Figure 5B:
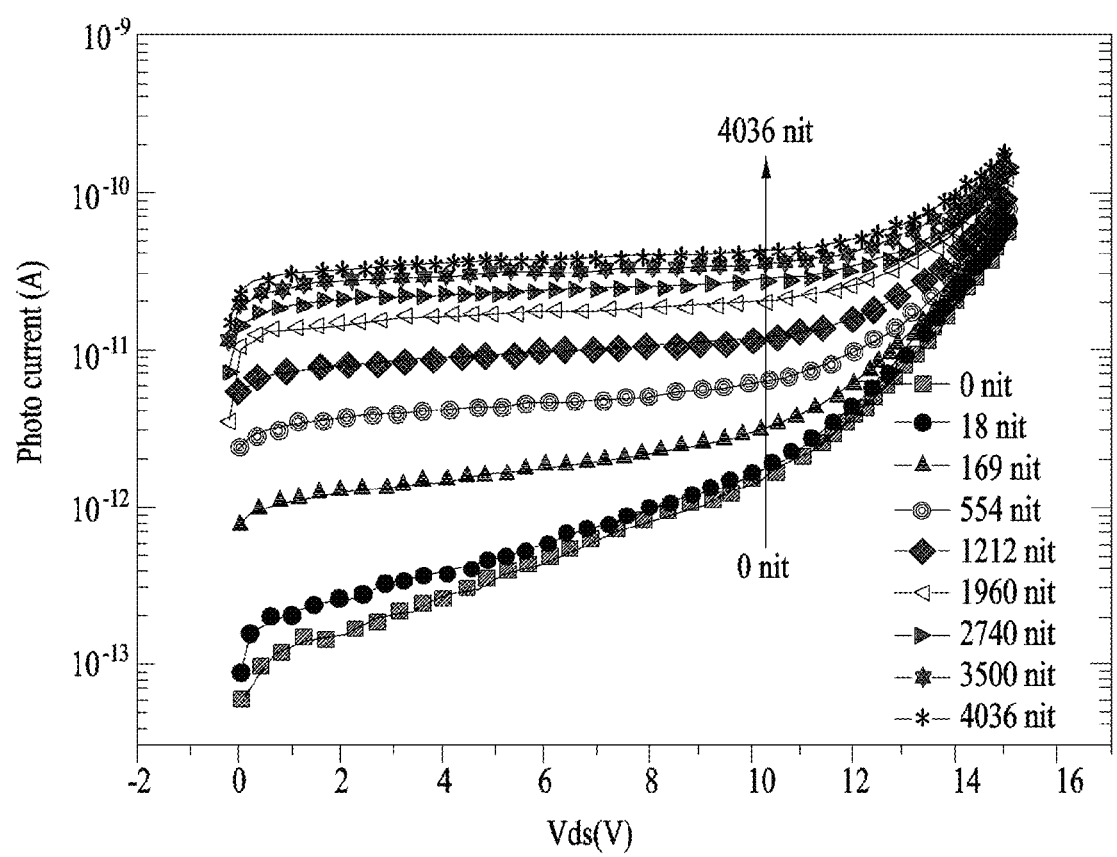

FIGS. 5A and 5B are graphs showing a variation in photocurrent according to a variation in Vds of a transistor of the sensor unit of FIG. 4.

In FIGS. 5A and 5B, after the transistor is formed as the photosensor 140 included in FIG. 4, photocurrent is measured by controlling incident light in addition to the above voltage condition.

In this case, when the same voltage of 0 V is applied to the source electrode and the gate electrode, the transistor functions as a P-intrinsic-N (PIN) diode. Thus, when a negative voltage is applied, it is determined that a forward voltage is applied. Therefore, current is increased according to the voltage. If a positive voltage is applied, measured photocurrent has a small value. Therefore, it can be seen that, as brightness is increased, photocurrent is close to saturation with respect to the positive voltage.

In this case, as shown in FIG. 5B, it can be seen that, even in an environment with low brightness of 18 nit, photocurrent differentiated from dark current (0 nit) is generated. External light of the sensor unit can be detected by detecting photocurrent.

Figure 6:
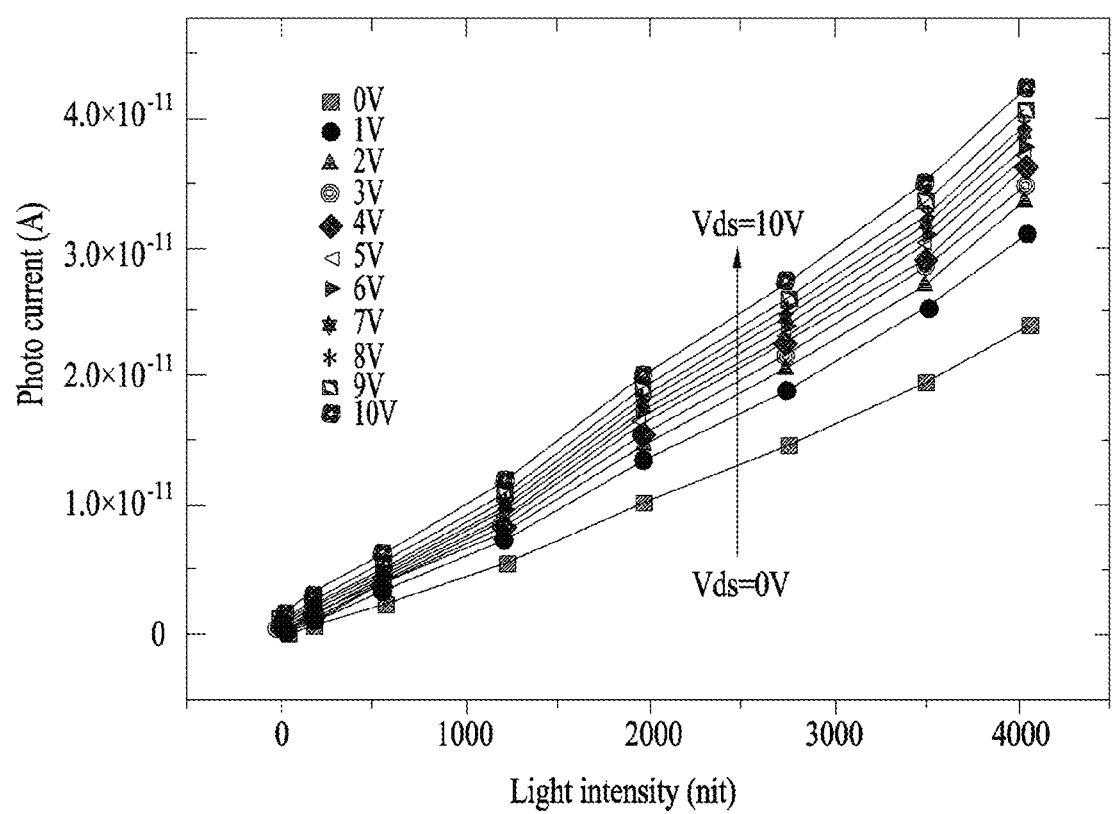
FIG. 6 is a graph showing the intensity of light incident to the transistor of the sensor unit and the level of the photocurrent generated at this time.

FIG. 6 is a graph showing the intensity of light incident to the transistor of the sensor unit and the level of the photocurrent generated at this time.

It can be seen from FIG. 6 that photocurrent is substantially linearly increased as the light intensity is increased.

Figure 7A:
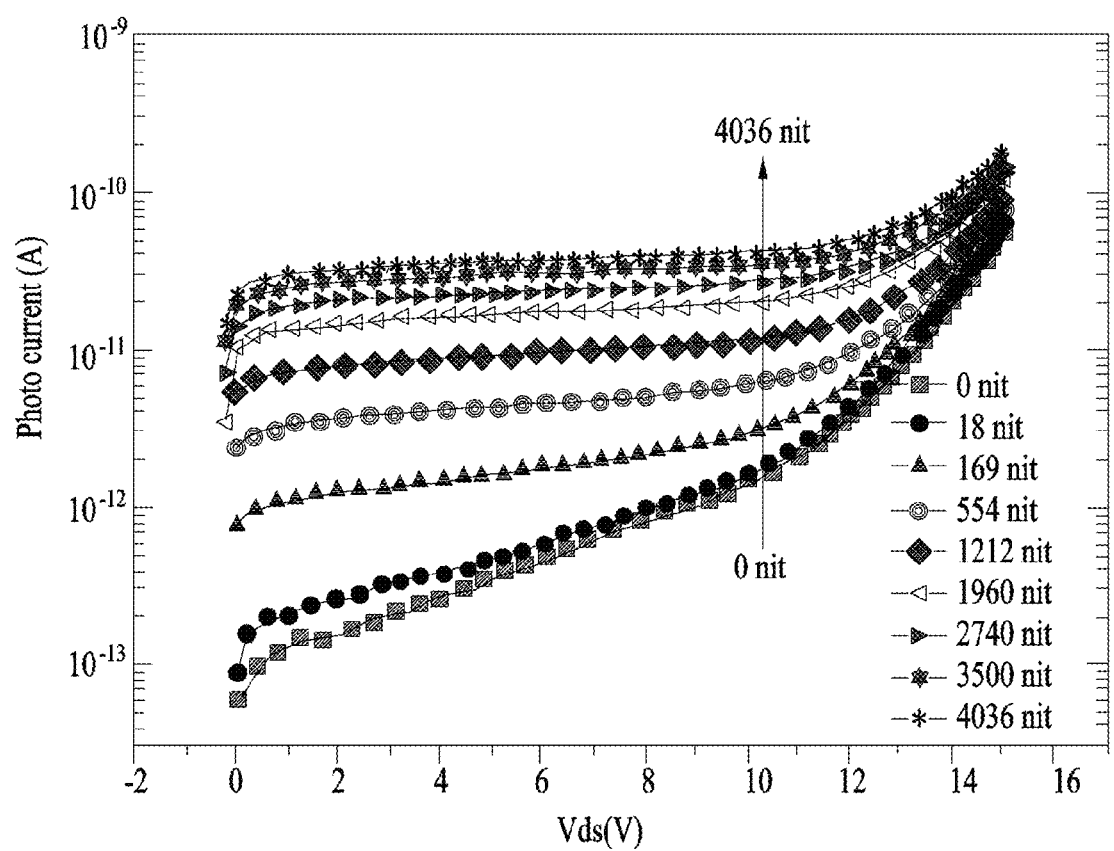
FIGS. 7A and 7B are graphs showing Vds vs. photocurrent according to brightness when W/L is set to 16/4 and 16/6, respectively.
Figure 7B:
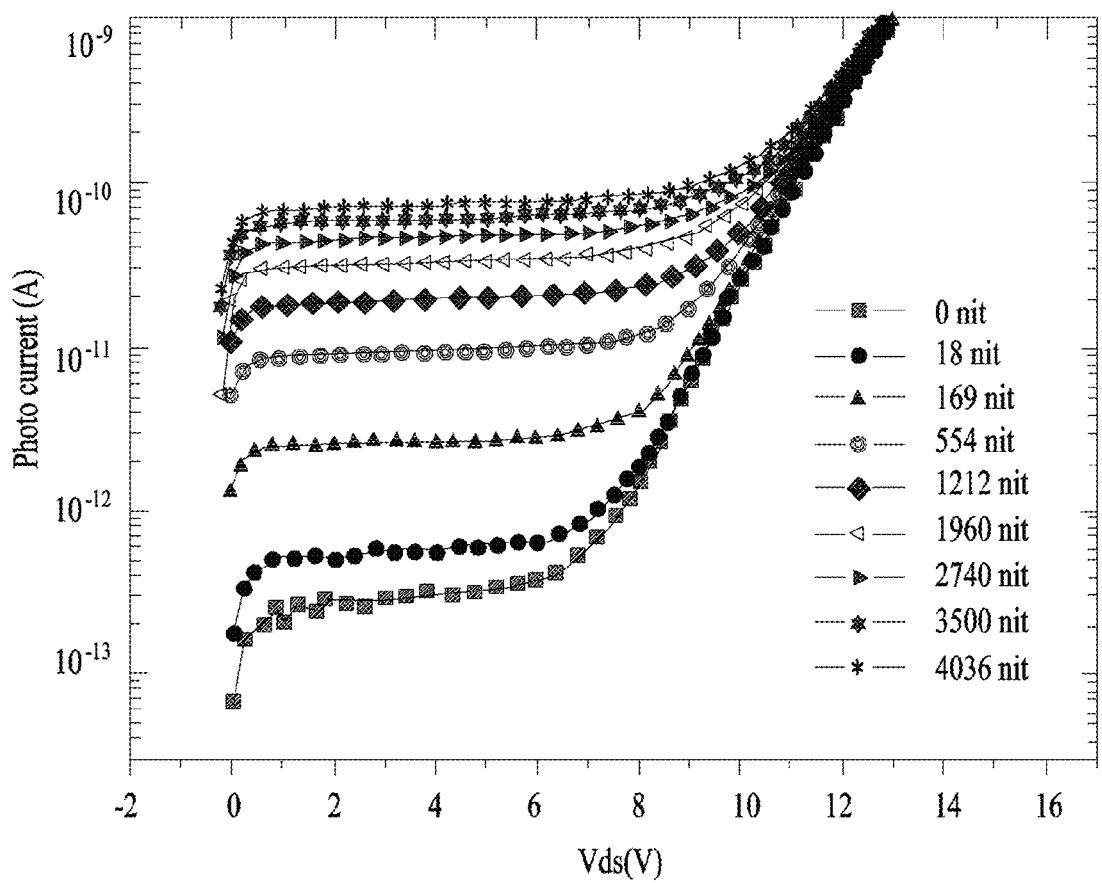

FIGS. 7A and 7B are graphs showing Vds vs. photocurrent according to brightness when W/L is set to 16 μm/4 μm and 16 μm/6 μm, respectively.

As shown in FIGS. 7A and 7B, either when the condition of W/L of the semiconductor layer is 16 μm/4 μm or 16 μm/6 μm, photocurrent is increased as Vds is increased. In addition, it can be seen that photocurrent is increased if ambient brightness is increased. However, it can be seen that, as the length L is increased with respect to the same width W, saturation quickly appears at a specific voltage value Vds.

Figure 8A:
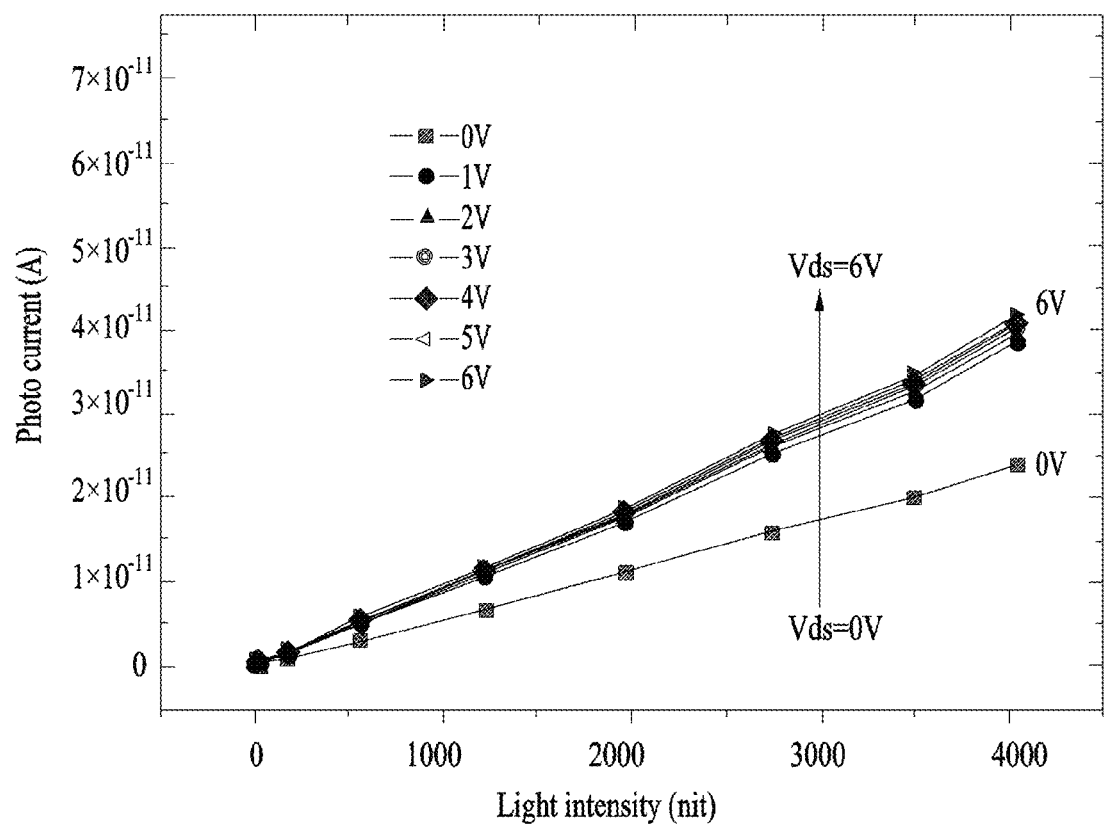
FIGS. 8A and 8B are graphs showing brightness vs. photocurrent according to Vds when W/L is set to 16/4 and 16/6, respectively.
Figure 8B:
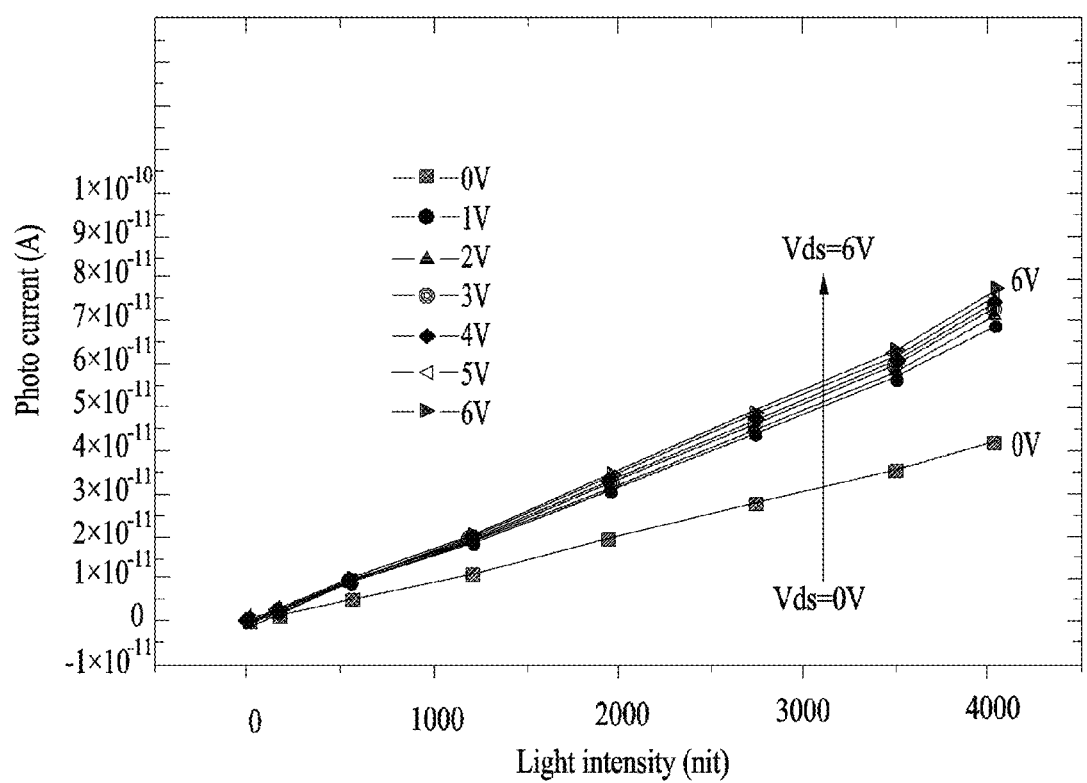

FIGS. 8A and 8B are graphs showing brightness vs. photocurrent according to Vds when W/L is set to 16 μm/4 μm and 16 μm/6 μm, respectively.

It can be seen from FIGS. 8A and 8B that photocurrent is increased if brightness is increased and a slope indicating a proportional relationship is increased as Vds is increased.

Figure 9:
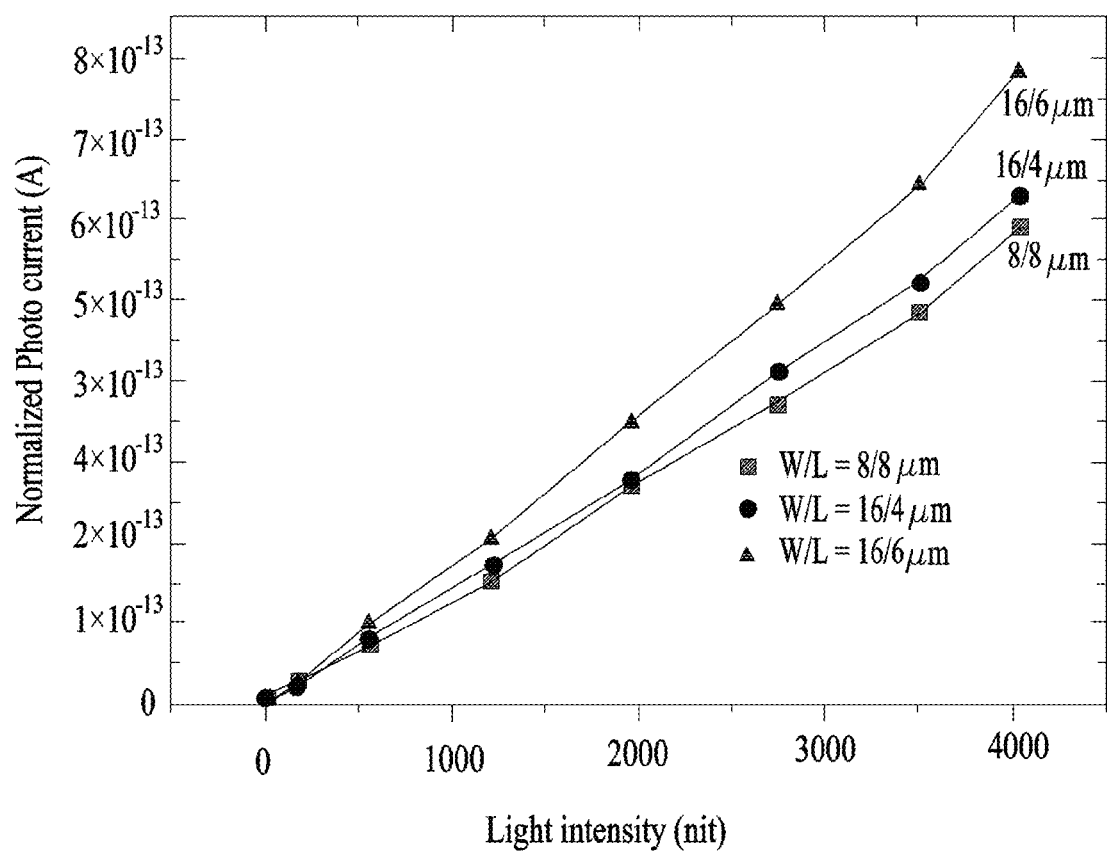
FIG. 9 is a graph showing photocurrent generated by the sensor unit per unit area.

FIG. 9 is a graph showing photocurrent generated by the sensor unit per unit area.

FIG. 9 shows photocurrent per unit area (1 μm×1 μm) obtained by dividing photocurrent by the area of the semiconductor layer when the W/L condition is 8 μm/8 μm, 16 μm/4 μm and 16 μm/16 μm. At this time, the electric field of a backward bias applied across both ends of the device is 7500 V/cm. Photocurrent generated per unit area at a brightness of 2000 nit is about $3 \times 10^{-13}$ A/μm². It can be seen that generated photocurrent is similar if a light reception area is identical.

As can be seen from the above experiments, in the TFT configuring the photosensor of the present invention, photocurrent is increased if brightness of external light is increased. This tendency is increased as Vds is increased.

A voltage condition including Vds of the TFT configuring the photosensor is selected and photocurrent is sensed, thereby judging the brightness of external light.

Under the same conditions, for comparison, the voltage with the same condition as that of the photosensor is also applied to the TFT configuring the dummy sensor.

A sensor capable of sensing light is located on the liquid crystal panel TFT array, a pad portion or a panel outside portion.

One or more sensors are located on the panel and are formed during a process of manufacturing a lower substrate.

As the sensor, in addition to a sensor for sensing external light, a dummy sensor insensitive to a variation in photocurrent due to external light or other factors is formed.

The outputs of the sensors are compared so as to control the brightness of the backlight unit.

An output variation can be output as a current or voltage value, and values output from a plurality of sensors are compared.

In the polysilicon liquid crystal panel, various functions are necessary. In order to control the brightness of the panel using external light, the sensor is mounted in the panel.

Since the PIN diode used as the photosensor generates photocurrent in response to light and generates current in response to temperature, the dummy sensor is located outside the panel such that the currents of the sensors are compared. Therefore, the backlight can be substantially controlled by only the influence of light.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a liquid crystal panel having a display area and a non-display area defined therein and including first and second substrates facing each other and a liquid crystal layer filled between the first and second substrates, the first substrate having an outer portion protruding from the second substrate;
a gate driver and a data driver formed in the non-display area of the first substrate;
a photosensor formed in the outer portion of the first substrate, wherein the photosensor is completely uncovered below and above by a light shielding layer;
a dummy sensor formed in the non-display area of the first substrate covered by the second substrate;
a backlight unit formed below the liquid crystal panel;
a control unit including a timing controller for controlling the gate driver, the data driver and the backlight unit, and a power supply unit for supplying a power voltage; and
the light shielding layer formed on each of the first substrate and the second substrate to completely cover the dummy sensor below and above, wherein the light shielding layer blocks light from the backlight unit and an external light including laterally incident light, wherein
the control unit controls a brightness of the backlight according to the brightness of external light only when a difference between an intensity of light output from the photosensor and an intensity of light output from the dummy sensor is greater than a predetermined threshold, the difference based on the light from the backlight unit and the external light including laterally incident light, and wherein the control unit excludes performance of an automatic brightness control operation when the difference is less than the predetermined threshold.

2. The liquid crystal display device according to claim 1, wherein the control unit includes a comparator configured to compare intensity of detected light from the photosensor with intensity of detected light from the dummy sensor, a calculator configured to calculate brightness of external light by a difference in intensity of light detected by the comparator, and a brightness controller configured to control brightness of a backlight according to the brightness of the external light.

3. The liquid crystal display device according to claim 1, wherein the first substrate includes:
 a plurality of gate lines and data lines which cross each other in the display area to define pixel areas;
 thin Film Transistors (TFTs) formed at intersections of the gate lines and the data lines and including a semiconductor layer formed of a polysilicon layer obtained by low-temperature crystallizing an amorphous silicon layer; and
 pixel electrodes respectively formed in the pixel areas.

4. The liquid crystal display device according to claim 1, wherein each of the photosensor and the dummy sensor is formed of a thin Film Transistor (TFT) including a polysilicon layer.

5. The liquid crystal display device according to claim 4, wherein the photosensor and the dummy sensor are simultaneously formed in a process of forming the TFT.

6. The liquid crystal display device according to claim 1, wherein the second substrate further includes:
 a black matrix layer corresponding to the plurality of gate lines and data lines.

7. The liquid crystal display device according to claim 1, wherein the photosensors and dummy sensor is included in plural.

8. The liquid crystal display device according to claim 1, wherein the dummy sensor is laterally displaced from imaginary extensions of two perpendicular sides of the display area that are closest to the dummy sensor.

9. A method for automatically controlling brightness in a liquid crystal display device including a liquid crystal panel having a display area and a non-display area defined therein and including first and second substrates facing each other and a liquid crystal layer filled between the first and second substrates, the first substrate having an outer portion protruding from the second substrate, a gate driver and a data driver formed in the non-display area of the first substrate, a backlight unit formed below the liquid crystal panel, and a control unit including a timing controller for controlling the gate driver, the data driver and the backlight unit, and a power supply unit for supplying a power voltage, the method comprising:

comparing intensity of detected light from a photosensor with intensity of detected light from a dummy sensor, wherein the photosensor and the dummy sensor are in the liquid crystal panel and wherein the photosensor is completely uncovered below and above by a light shielding layer;

calculating brightness of external light by a difference between the intensity of detected light from the photosensor and the intensity of detected light from the dummy sensor; and controlling brightness of backlight according to the calculated brightness of external light, wherein the liquid crystal panel includes the photosensor formed in the outer portion of the first substrate and a dummy sensor formed in the non-display area of the first substrate covered by the second substrate, wherein the light shielding layer is formed on each of the first substrate and the second substrate to completely cover the dummy sensor below and above, and the light shielding layer blocks light from the backlight unit and an external light including laterally incident light, wherein the control unit controls a brightness of the backlight according to the brightness of external light only when the difference between the intensity of light output from the photosensor and the intensity of light output from the dummy sensor is greater than a predetermined threshold, the difference based on the light from the backlight unit and the external light including laterally incident light, and wherein the control unit excludes performance of an automatic brightness control operation when the difference is less than the predetermined threshold.

10. The method according to claim 9, wherein the photosensor is formed of a thin film transistor in which photocurrent is changed according to external light and which includes a low-temperature crystallized polysilicon layer.

11. The method according to claim 10, wherein the comparing of the intensity of detected light from the photosensor with the intensity of detected light from the dummy sensor is performed by detecting a difference between voltages output from the photosensor and the dummy sensor.

12. The method according to claim 10, wherein the comparing of the intensity of detected light from the photosensor with the intensity of detected light from the dummy sensor is performed by detecting a difference between currents output from the photosensor and the dummy sensor.

13. The method according to claim 9, wherein the dummy sensor is laterally displaced from imaginary extensions of two perpendicular sides of the display area that are closest to the dummy sensor.

* * * * *